United States Patent
Kwon et al.

(10) Patent No.: US 9,664,848 B2
(45) Date of Patent: May 30, 2017

(54) LIGHT GUIDING PLATE, BACKLIGHT MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Young Man Kwon, Beijing (CN); Tae Sung Kang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 33 days.

(21) Appl. No.: 14/359,321

(22) PCT Filed: Dec. 16, 2013

(86) PCT No.: PCT/CN2013/089510
§ 371 (c)(1),
(2) Date: May 20, 2014

(87) PCT Pub. No.: WO2015/024341
PCT Pub. Date: Feb. 26, 2015

(65) Prior Publication Data
US 2015/0219840 A1 Aug. 6, 2015

(30) Foreign Application Priority Data
Aug. 23, 2013 (CN) .......................... 2013 1 0373882

(51) Int. Cl.
*F21V 8/00* (2006.01)

(52) U.S. Cl.
CPC .......... *G02B 6/0093* (2013.01); *G02B 6/0086* (2013.01); *G02B 6/0088* (2013.01)

(58) Field of Classification Search
CPC .................................................. G02B 6/0093
See application file for complete search history.

(56) References Cited

U.S. PATENT DOCUMENTS 6,055,029 A * 4/2000 Kurihara et al. ............... 349/65
2003/0202135 A1 10/2003 Ono et al.
(Continued)

FOREIGN PATENT DOCUMENTS

| CN | 1453613 A | 11/2003 |
| CN | 1847942 A | 10/2006 |

(Continued)

OTHER PUBLICATIONS

First Office Action issued by the Chinese Patent Office for Chinese Patent Application No. 201310373882.1 dated Feb. 2, 2015, 10 pages.
(Continued)

*Primary Examiner* — Renee Chavez
*Assistant Examiner* — Eric T Eide
(74) *Attorney, Agent, or Firm* — Ladas & Parry LLP (57) ABSTRACT

Embodiments of the present invention provide a light guiding plate, a backlight module and a display device. The light guiding plate comprises a body having an effective light guiding region corresponding to an effective display region of a display panel and a peripheral region located at peripheries of the effective light guiding region, and a supporter installed in the peripheral region for providing a support force in a direction opposite to a direction of gravity of the body. Since the supporter provides a support force in a direction opposite to a direction of gravity of the body of the light guiding plate, problem of deformation of the light guiding plate due to gravity can be prevented.

2 Claims, 7 Drawing Sheets

(56) References Cited

U.S. PATENT DOCUMENTS

| | | | |
|---|---|---|---|
| 2006/0227572 A1* | 10/2006 | Chen | 362/633 |
| 2008/0074579 A1* | 3/2008 | Yu | 349/64 |
| 2009/0073338 A1* | 3/2009 | Jeong | 349/58 |
| 2009/0103282 A1* | 4/2009 | Itaya | 362/97.1 |
| 2011/0149602 A1 | 6/2011 | Lee et al. | |

FOREIGN PATENT DOCUMENTS

| | | |
|---|---|---|
| CN | 101994962 A | 3/2011 |
| CN | 102102832 A | 6/2011 |
| CN | 102364384 A | 2/2012 |
| JP | 2008-196002 A | 8/2008 |

OTHER PUBLICATIONS

English translation of First Office Action (listed above) issued by the Chinese Patent Office for Chinese Patent Application No. 201310373882.1 dated Feb. 2, 2015, 8 pages.
English abstract of CN1453613A, listed above; 1 page.
English abstract of CN1847942A, listed above; 1 page.
English abstract of CN102364384A, listed above, 2 pages.
International Search Report for International Application No. PCT/CN2013/089510 issued Jun. 10, 2014, 12pgs.
Third Chinese Office Action dated Sep. 21, 2015; Appln. No. 201310373882.1.
International Preliminary Report on Patentability Appln. No. PCT/CN2013/089510; Dated Feb. 23, 2016.

* cited by examiner

LIGHT GUIDING PLATE, BACKLIGHT MODULE AND DISPLAY DEVICE

CROSS REFERENCE TO RELATED APPLICATIONS

This application is based on International Application No. PCT/CN2013/089510 filed on Dec. 16, 2013, which claims priority to Chinese National Application No. 201310373882.1 filed on Aug. 23, 2013. The entire contents of each and every foregoing application are incorporated herein by reference.

TECHNICAL FIELD

Embodiments of the present invention relate to a light guiding plate, a backlight module and a display device.

BACKGROUND

It is well-known that liquid crystal display (LCD) is not a self-emission display device. A backlight module is a key component of the LCD for providing light source having sufficient brightness and uniform distribution, so that the LCD can display image properly. Currently, the backlight module mainly comprises a light source, a light guiding plate (LGP) and optical sheets. In general, a lamp or a light emitting diode (LED) is used as the light source. The light guiding plate is mainly designed to change path of the lights so as to guide lights emitted from the light source toward a desired direction. The optical sheet is mainly designed to converge lights, so that the backlight module emits uniform lights.

SUMMARY

Embodiments of the present invention provide a light guiding plate, a backlight module and a display device for improving problem of deformation of the light guiding plate.

Embodiments of the present invention provide a light guiding plate. The light guiding plate comprises a body having an effective light guiding region corresponding to an effective display region of a display panel and a peripheral region located at peripheries of the effective light guiding region, and a supporter installed in the peripheral region for providing a support force in a direction opposite to a direction of gravity of the body.

In the light guiding plate according to embodiments of the present invention, a supporter is provided in the peripheral region of the light guiding plate. Since the supporter provides a support force in direction opposite to a direction of gravity of the body of the light guiding plate, a problem of deformation of the light guiding plate due to gravity can be prevented.

For example, the supporter is disposed on a surface of the body or embedded in the body.

For example, in the light guiding plate according to embodiments of the present invention, the effective light guiding region of the body has a quadrilateral shape, and the supporter is a support bar configured in a shape corresponding to at least one side of the effective light guiding region.

For example, in the light guiding plate according to embodiments of the present invention, the supporter is a sealing frame disposed on the peripheral region of the body.

For example, in order to reduce the weight of the light guiding plate, in the light guiding plate according to embodiments of the present invention, the supporter has a hollowed structure.

For example, in the light guiding plate according to embodiments of the present invention, the supporter comprises a first metal layer and a second metal layer sequentially arranged along the direction of gravity and the first metal layer has a thermal expansion coefficient greater than that of the second metal layer.

For example, in the light guiding plate according to embodiments of the present invention, the supporter is made of a shape-memory material.

For example, in the light guiding plate according to embodiments of the present invention, the shape-memory material is a titanium-nickel alloy.

Embodiments of the present invention also provide a backlight module comprising the light guiding plate according to embodiments of the present invention.

Embodiments of the present invention also provide a display device comprising the backlight module according to embodiments of the present invention.

DETAILED DESCRIPTION

In order to make objects, technical solutions and advantages of the embodiments of the invention apparent, the technical solutions of the embodiment will be described clearly and fully in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention. Hereinafter, various exemplary embodiments are described in detail with reference to the accompanying drawings. Obviously, the following embodiments are used to explain the present invention, and are not intend to limit the present invention.

Size and shape of the components of the light guiding plate are not drawn to scale in the accompanying drawings, but only for the purpose of illustrating the present invention.

Figure 1:
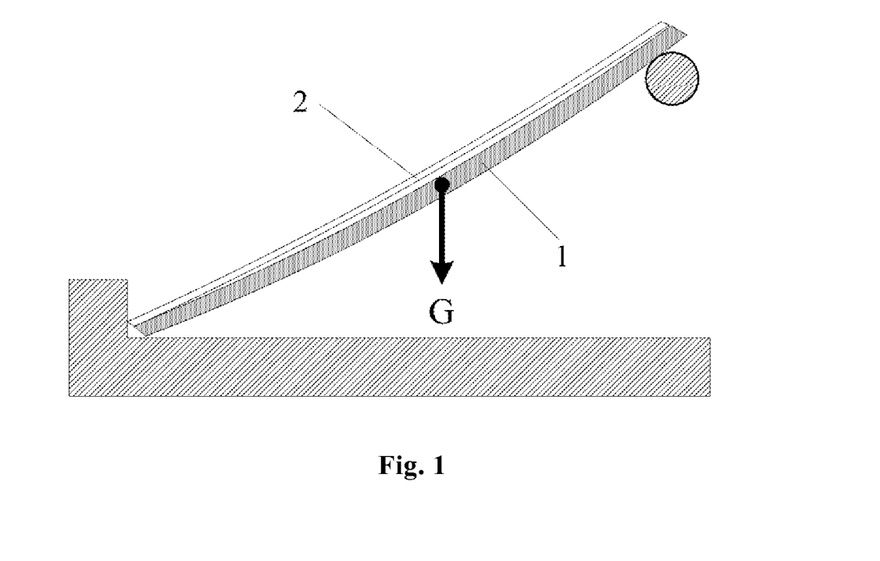
FIG. 1 is a schematic view illustrating a bent light guiding plate and a bent optical sheet.

Currently, the development trend of liquid crystal display is lighter and thinner, which have restrictions on the weight and thickness of the liquid crystal display as well as the weight and thickness of the backlight module. For example, in a thin notebook computer, a reflective sheet, instead of a back cover, is provided on the back of the backlight module. In general, the light guiding plate in the backlight module has a thickness ranging from 2 mm at a thick side to 0.6 mm at a thin side. Light guiding plate in an ultra thin notebook computer even has a thickness of about 1 mm. In such backlight module, as shown in FIG. 1, central potion of the light guiding plate 1 can bend permanently due to gravity. The thinner the light guiding plate 1 is, the easier the bend occurs. The optical sheet 2 placed on the light guiding plate 1 can be permanently deformed due to the bend of the light guiding plate 1. The deformation of the optical sheet 2 can cause problems such as crinkles, light leakage and so on, thus display quality of the liquid crystal display is deteriorated. In addition, stress inside the light guiding plate at high temperature can cause permanent deformation of the light guiding plate, leading to permanent deformation of the optical sheet, thus causing problems such as crinkle, light leakage and so on.

As the display device becomes lighter and thinner, the above problems such as crinkle, light leakage and so on due to deformation of the light guiding plate occur not only in the notebook computer, but also in a display and television with high possibilities.

As shown in FIGS. 2a to 2k, a light guiding plate according to embodiments of the present invention comprises a body 01. The body 01 comprises an effective light guiding region a corresponding to an effective display region of the display and a peripheral region b located at the periphery of the effective light guiding region a.

The light guiding plate further comprises a supporter 02 disposed in the peripheral region b for providing support force in a direction opposite to a direction of gravity of the body 01.

Figure 3:
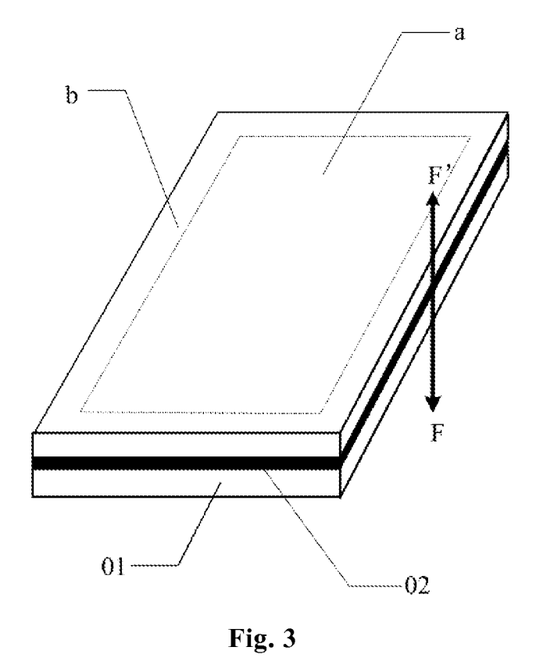
FIG. 3 is a schematic view illustrating principle of the light guiding plate according to embodiments of the present invention.

Since the light guiding plate according to embodiments of the present invention comprises a supporter 02 in the peripheral region b of the body 01, as shown in FIG. 3, the supporter 02 provides a support force F' in a direction opposite to the direction of gravity F of the body 01 of the light guiding plate. Therefore, the deformation of the light guiding plate due to gravity is prevented.

Figure 2A:
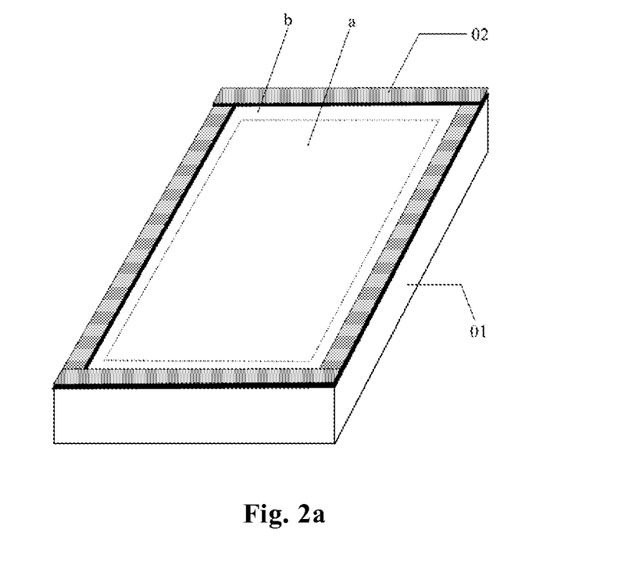
FIGS. 2a to 2k are schematic views illustrating structure of a light guiding plate according to embodiments of the present invention.
Figure 2B:
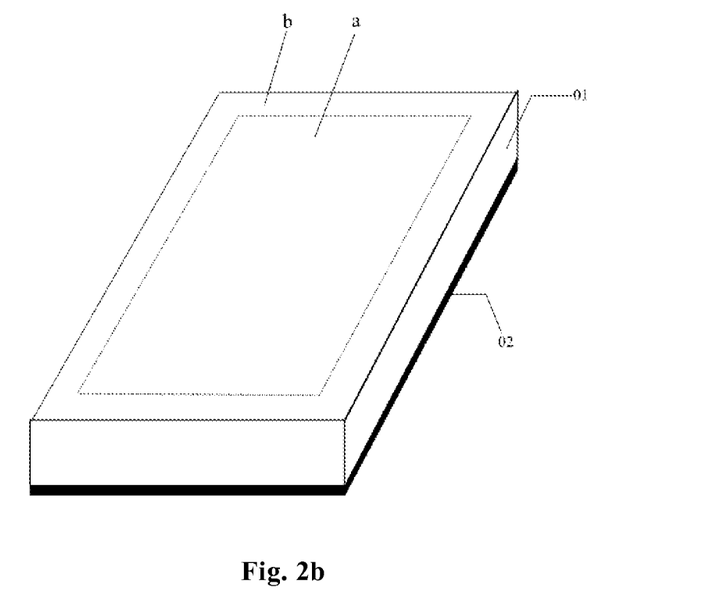
Figure 2C:
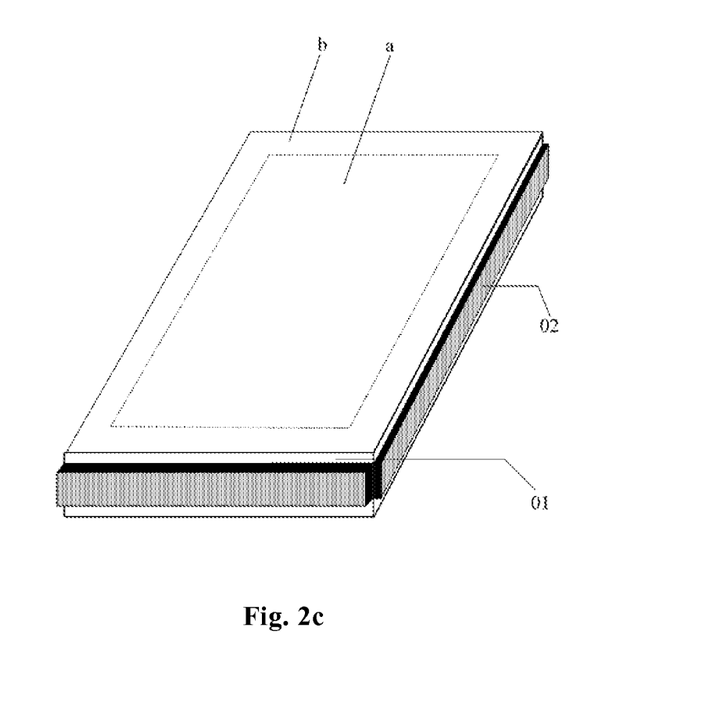
Figure 2D:
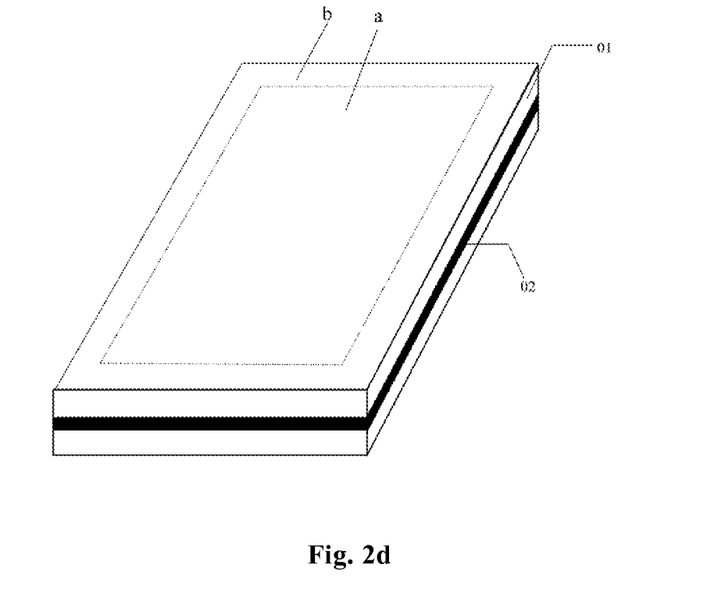

For example, the supporter 02 of the light guiding plate according to embodiments of the present invention can be disposed on an upper surface, a lower surface or side surfaces of the body 01, as shown in FIGS. 2a to 2c. Alternatively, the supporter 02 can be embedded in the body 01, as shown in FIG. 2d. However, the supporter 02 is not limited to the above embodiments. The supporter 02 embedded in the body 01 leads to a reduced overall size of the space occupied by the light guiding plate, but complexity of the preparing process will be increased.

In general, the light guiding plate has an upper surface, a lower surface and a plurality of side surface. In particularly, the supporter 02 can be disposed only on the upper surface of the peripheral region b of the body 01, as shown in FIG. 2a. Alternatively, the supporter 02 can also be disposed only on the lower surface of the peripheral region b of the body 01, as shown in FIG. 2b. Alternative, the supporter 02 can also be disposed on the side surfaces of the body 01, as shown in FIG. 2c. It is apparent that the supporter 02 can be disposed both on the upper and lower surfaces of the peripheral region b of the body 01. However, positions of the supporter 02 are not limited thereto.

Figure 2E:
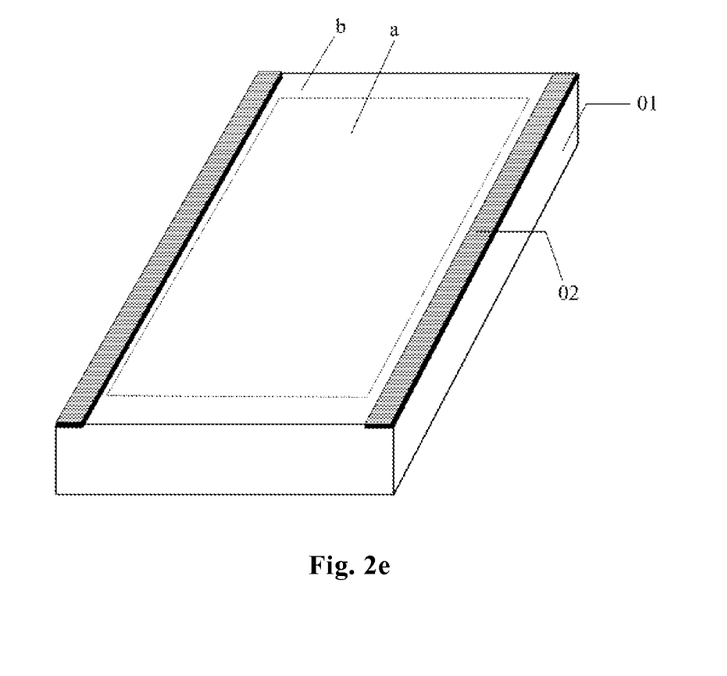

For example, in the light guiding plate according embodiments of the present invention, the effective light guiding region a of the body 01 has a quadrilateral shape, and the supporter 02 is a support bar (s) corresponding to at least one side of the effective light guiding region a. For example, as shown in FIG. 2e, the supporter 02 comprises two support bars disposed on opposite sides of the effective light guiding region a. Alternatively, the supporter 02 comprises support bars disposed on all four sides of the effective light guiding region a for preventing deformation of the light guiding plate to a maximum degree. However, in this case, the overall weight of the light guiding plate will be increased. In the implementation of the present invention, the number and positions of the support bars of the supporter 02 can be selected according to practical need, and there is no limitation.

Figure 2F:
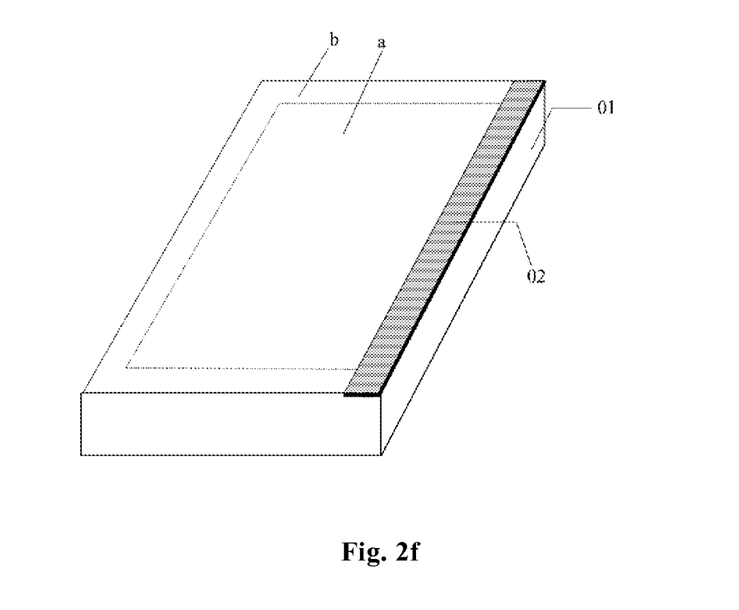
Figure 2G:
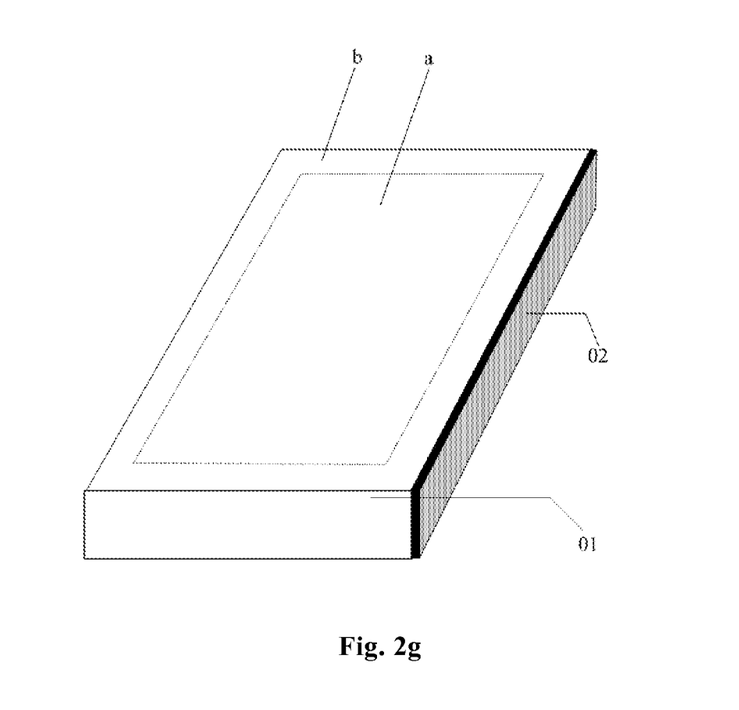

Furthermore, in the light guiding plate according to embodiments of the present invention, in case that the support bar is disposed on the upper surface or lower surface of the body 01, the maximal width of the support bar is equal to the width of the peripheral region on which the support bar is disposed, as shown in FIG. 2f. When the support bars are disposed on the side surfaces of the body 01, the maximal width of the support bar is equal to the thickness of the portion of the body 01 where the support bar is disposed, as shown in FIG. 2g.

Figure 2H:
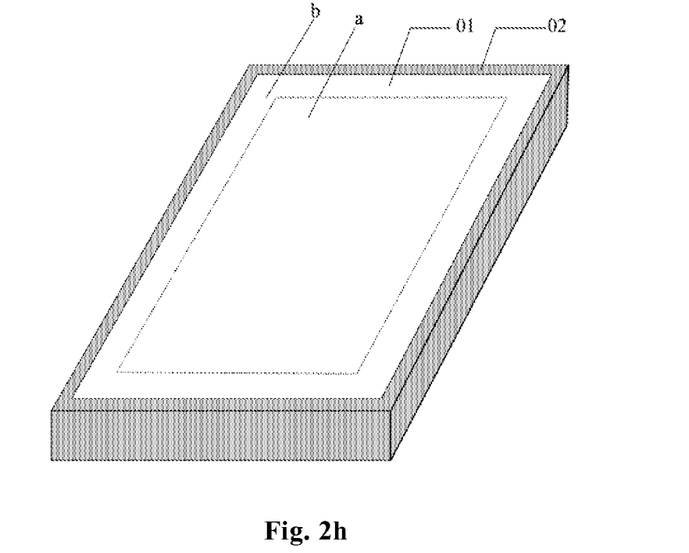
Figure 2I:
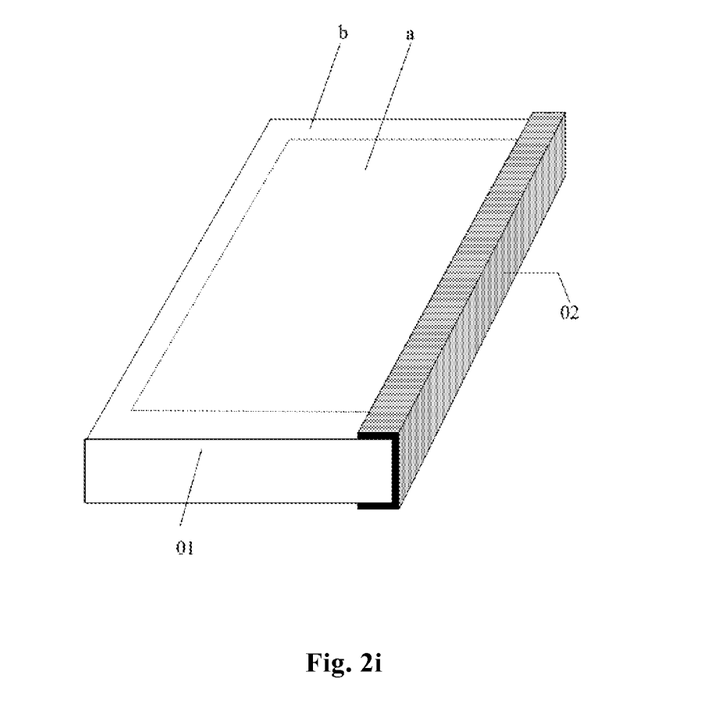

For example, in the light guiding plate according to embodiments of the present invention, the supporter 02 can also be a sealing frame disposed on the peripheral region b of the body 01 in order to prevent deformation of the light guiding plate to the maximum degree. For example, as shown in FIG. 2h, the sealing frame has a ring structure surrounding four sides of the peripheral region b of the body 02. As shown in FIG. 2i, the sealing frame has a clamping structure covering only a portion of the peripheral region b corresponding to one side of the effective light guiding region a.

Figure 2J:
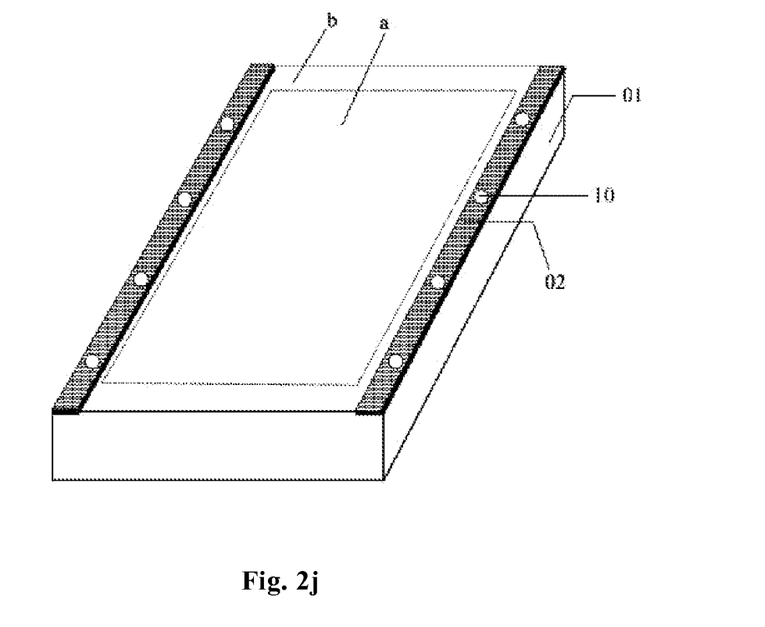

Furthermore, in the implementation of the embodiments, the supporter 02 in the light guiding plate according to the embodiments of the present can have a hollowed structure so as to reduce the weight of the light guiding plate. For example, the hollowed structure has one or more holes 10 penetrating through the supporter 02 in a thickness direction, as shown in FIG. 2j. The holes 10 can have cross sectional shape such as circular, triangular, square, etc., but not limited thereto.

Figure 2K:
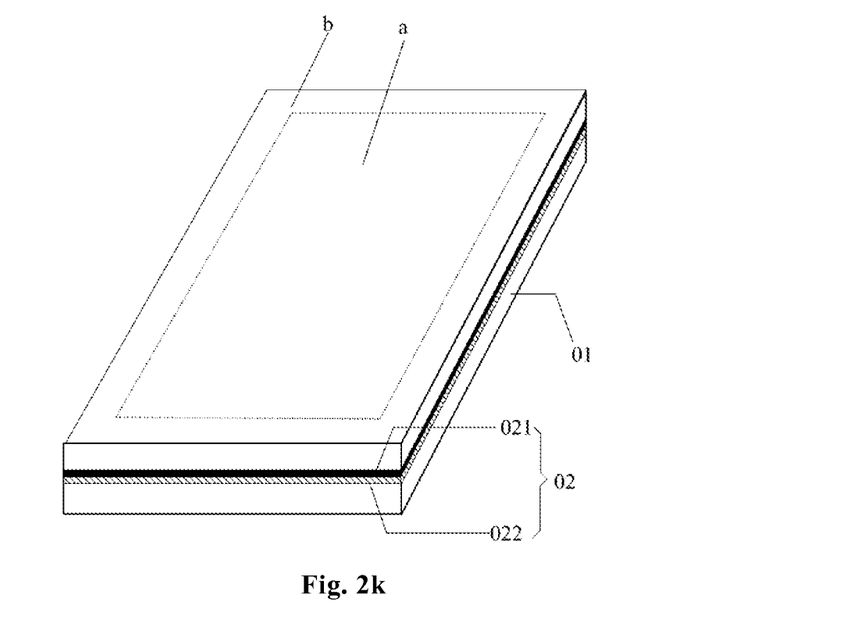

For example, in the light guiding plate according to embodiments of the present invention, as shown in FIG. 2k, the supporter 02 comprises a first metal layer 021 and a second metal layer 022 sequentially arranged along the direction of gravity. The first metal layer 021 has a thermal expansion coefficient greater than that of the second metal layer 022. During operation, the support 02 is heated by light sources. Since the thermal expansion of the first metal layer is greater than that of the second metal layer, a thermal stress in a direction opposite to the direction of gravity is generated inside the supporter 02 consisting of the first and second metal layers 021 and 022, thus reducing the bending of the light guiding plate due to gravity.

For example, in the light guiding plate according to embodiments of the present invention, the supporter 02 can be made of a shape-memory material. Since the shape-memory material has a property to restore its original shape at a certain temperature, the supporter 02 made of the shape-memory material can provide a restoring force in direction opposite to the direction of gravity of the light guiding plate, thus reducing the bending of the light guiding plate due to gravity.

For example, in implements of the embodiments, the shape-memory material is a shape-memory alloy, e.g., a gold-cadmium alloy, silver-cadmium alloy, copper-zinc alloy, copper-zinc-aluminum alloy, copper-zinc-silicon alloy, copper-tin alloy, copper-zinc-gallium alloy, indium-titanium alloy, gold-copper-zinc alloy, nickel-aluminum alloy, iron-platinum alloy, titanium-nickel alloy, titanium-nickel-palladium alloy, titanium-niobium alloy, and iron-manganese-silicon alloy, etc., but not limited thereto. The shape-memory material can also either be a shape-memory ceramic material or a shape-memory polymer material in the embodiments of the present invention, but not limited thereto.

For example, in implements of the embodiments, the shape-memory material is a titanium-nickel alloy.

It is to note that in the light guiding plate according to embodiments of the present invention, the supporter can be installed during or after an injection molding or extrusion molding of the light guiding plate.

The embodiments of the present invention also provide a backlight module comprising the light guiding plate according to the above embodiments of the present invention. Implementation of the backlight module can refer to embodiments of the light guiding plate described as above, and the detailed description will be omitted.

The embodiments of the present invention also provide a display device comprising the backlight module according to the above embodiments of the present invention. The display device can be tablet computers, televisions, monitors, notebook computers, digital picture frames, navigation and other products or components having display function. Implementation of the display device can refer to embodiments of the light guiding plate described as above, and the detailed description will be omitted.

Embodiments of the present invention provide a light guiding plate, a backlight module, and a display device. The light guiding plate comprises a body. The body has an effective light guiding region corresponding to the effective display region of the display panel and a peripheral region disposed on the periphery of the effective light guiding region. The light guiding plate further comprises a supporter disposed on the peripheral region for providing a support force in direction opposite to the direction of gravity of the body. Since the supporter can provide a support force in direction opposite to direction of gravity of the body of the light guiding plate, problems of deformation of the light guiding plate due to gravity can be prevented.

The foregoing is merely the exemplary embodiments of the present invention, and is not intended to limit the present invention. It will note for those skilled in the art that some modifications and substitutions without departing technical principle of the present invention are within the protection scope of the present invention.

What is claimed is:

1. A reinforced light guiding plate, comprising:
   a body having an effective light guiding region corresponding to an effective display region of a display panel and a peripheral region located at peripheries of the effective light guiding region, and
   a supporter installed in the peripheral region of the body for providing a support force in a direction opposite to a direction of gravity of the body,
   wherein the supporter is disposed only on a lower surface of the body, only on side surfaces of the body or embedded in the side surfaces of the body, the supporter surrounds the effective light guiding region completely and is made of a shape-memory material, and
   the support comprises a first metal layer and a second metal layer sequentially arranged along the direction of gravity and the first metal layer has a thermal expansion coefficient greater than that of the second metal layer.

2. A display device comprising a reinforced light guiding plate comprising:
   a body having an effective light guiding region corresponding to an effective display region of a display panel and a peripheral region located at peripheries of the effective light guiding region, and
   a supporter installed in the peripheral region of the body for providing a support force in a direction opposite to a direction of gravity of the body,
   wherein the supporter is disposed only on a lower surface of the body, or only on side surfaces of the body or embedded in the side surfaces of the body, the supporter surrounds the effective light guiding region completely and is made of a shape-memory material, and
   the support comprises a first metal layer and a second metal layer sequentially arranged along the direction of gravity and the first metal layer has a thermal expansion coefficient greater than that of the second metal layer.

* * * * *